UNITED STATES PATENT OFFICE.

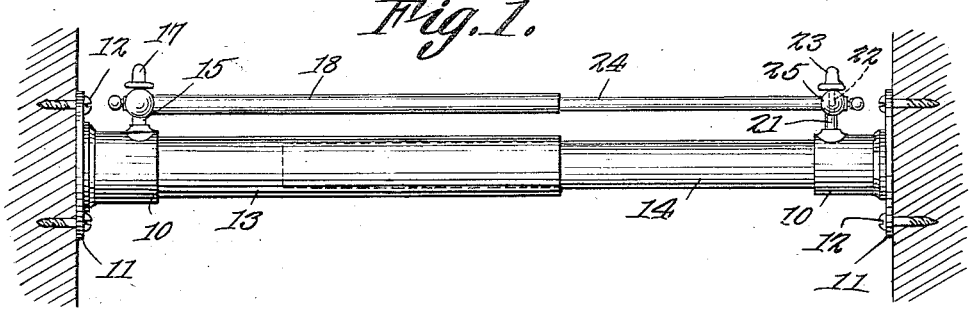
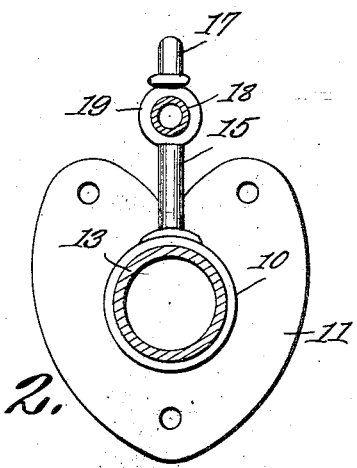
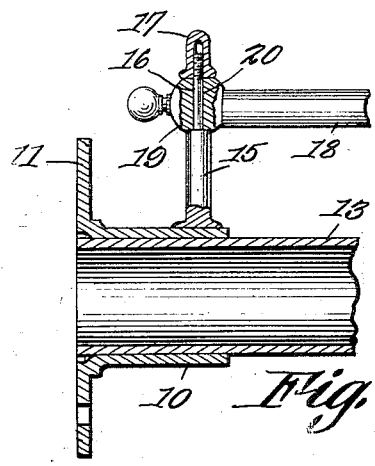
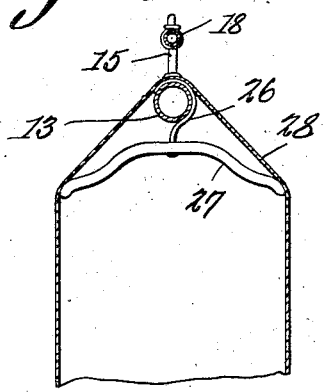
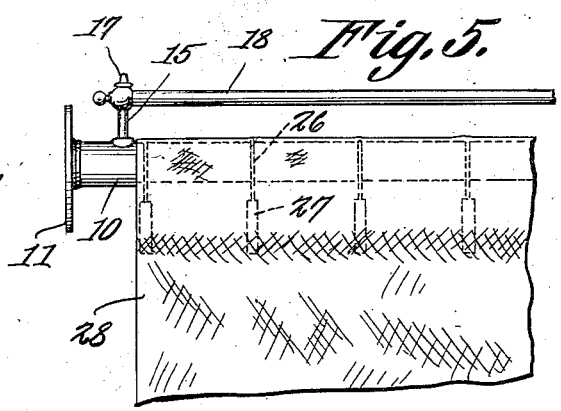

KENNETH A. BESCHER, OF FORT DODGE, IOWA.

HANGING BRACKET.

1,282,174.　　　Specification of Letters Patent.　　Patented Oct. 22, 1918.

Application filed January 4, 1918.　Serial No. 210,354.

*To all whom it may concern:*

Be it known that I, KENNETH A. BESCHER, a citizen of the United States of America, and resident of Fort Dodge, in the county of Webster and State of Iowa, have invented certain new and useful Improvements in Hanging Brackets, of which the following is a specification.

This invention relates to hanging brackets and particularly to a rail adapted for supporting clothes hangers or the like.

An object of this invention is to provide novel means which are extensible to fit in spaces of different lengths so that a single fixture will be employed without it being necessary to change the structure of the device itself or the walls to which the supports are anchored.

A further object of this invention is to provide a hanger supporting device having provision for retaining a curtain or protecting cover so that it may fall over the garments being held by the hangers.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 illustrates a view in elevation of a device embodying my invention;

Fig. 2 illustrates a sectional view thereof;

Fig. 3 illustrates a longitudinal sectional view with parts in elevation;

Fig. 4 illustrates a sectional view showing the hanger applied to the support and a cover therefor; and Fig. 5 illustrates a view in elevation of a fragment of the hanger showing the cover.

In these drawings 10 denotes sockets which have flanges 11 adapted to abut and be secured to a wall by fastenings such as screws 12. One of the sockets has a tubular member 13 extending from it and the other socket has a member 14 extending from it adapted to fit in the tubular member so that the members 13 and 14 may be telescopically assembled.

One socket also a post 15 rising from it and a threaded shank 16 forming an extension thereof, the said threaded shank being supplied with a nut 17. A tubular member 18 has an enlarged end 19 with an aperture 20 to receive the threaded shank and the opposite socket has a post 21 with a threaded shank 22 adapted to be engaged by a nut 23. A tube or rod 24 has an enlarged end 25 which is adapted to fit on the threaded shank 22 and the member 24 slides in the tubular member 18 so that as the sections of the hanger supports slide, one with relation to the other, there is a corresponding sliding motion of the tube 18 and member 24 so that they are coextensive in length. The tube 18 and member 24 are elevated a suitable distance above the hanger support and the clearance therebetween is adapted to receive the hooks 26 of the hangers 27 as well as a cover 28 which will extend over the garments held by the hangers, thus making a storage place for garments equal in effectiveness to a closet or wardrobe.

A device made in accordance with this invention is comparatively inexpensive while at he same time, it is very strong and durable and will withstand unusual strain since the upper telescoping members serve as braces and reinforcements to the hanger supports.

I claim:

In a hanger support, sockets adapted to be anchored to walls, a member extending from each of the sockets adapted to engage and telescope with relation to each other, a post rising from each of the sockets and each having a threaded shank constituting an extension thereof, members adapted to telescope with relation to each other, each of the said members having an aperture for the reception of one of the threaded shanks, and means for holding the said members on the threaded shanks.

KENNETH A. BESCHER.